Jan. 13, 1942.    H. N. DURHAM ET AL    2,269,444
TESTING DEVICE
Filed July 17, 1937    9 Sheets-Sheet 9

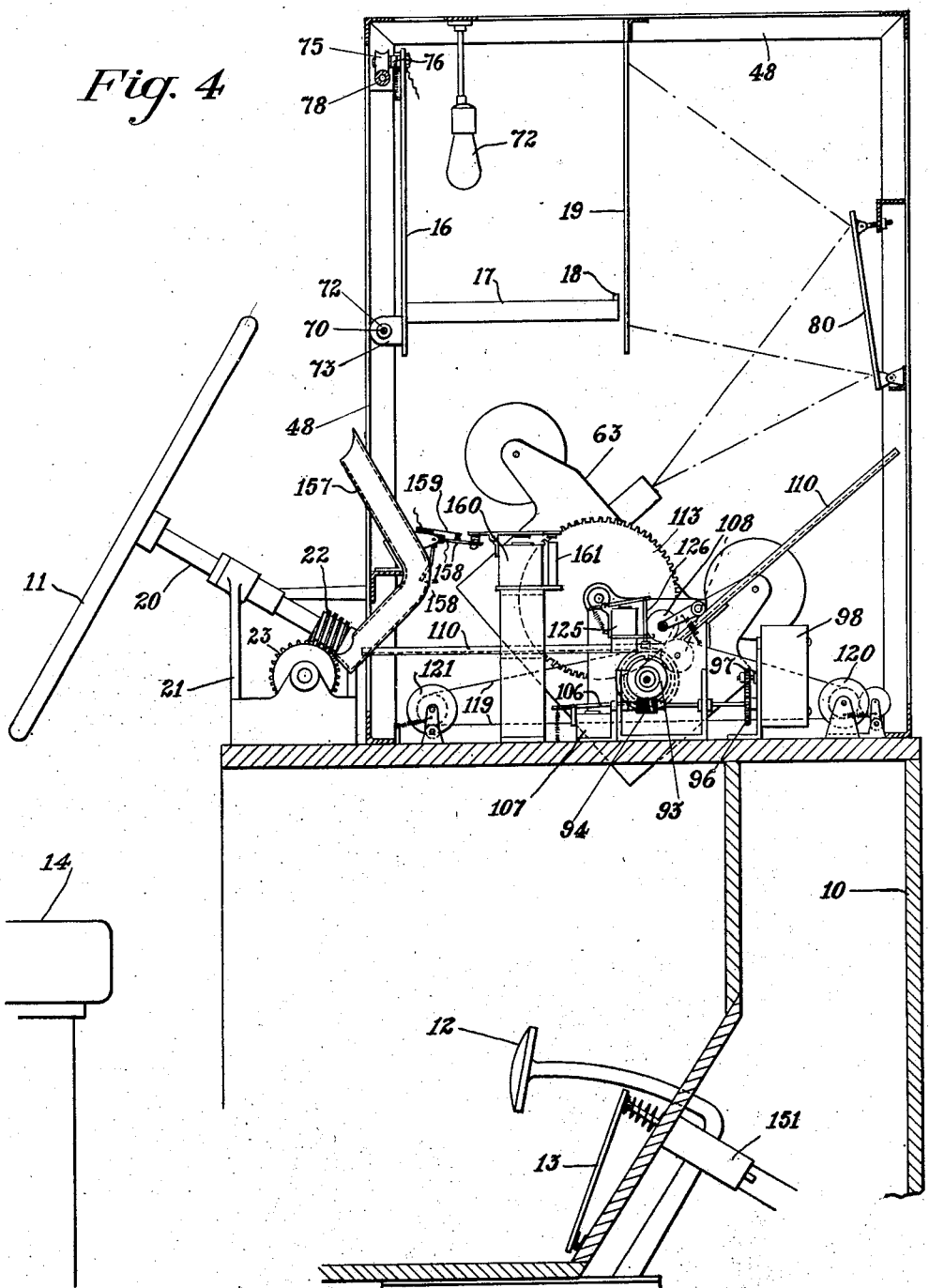

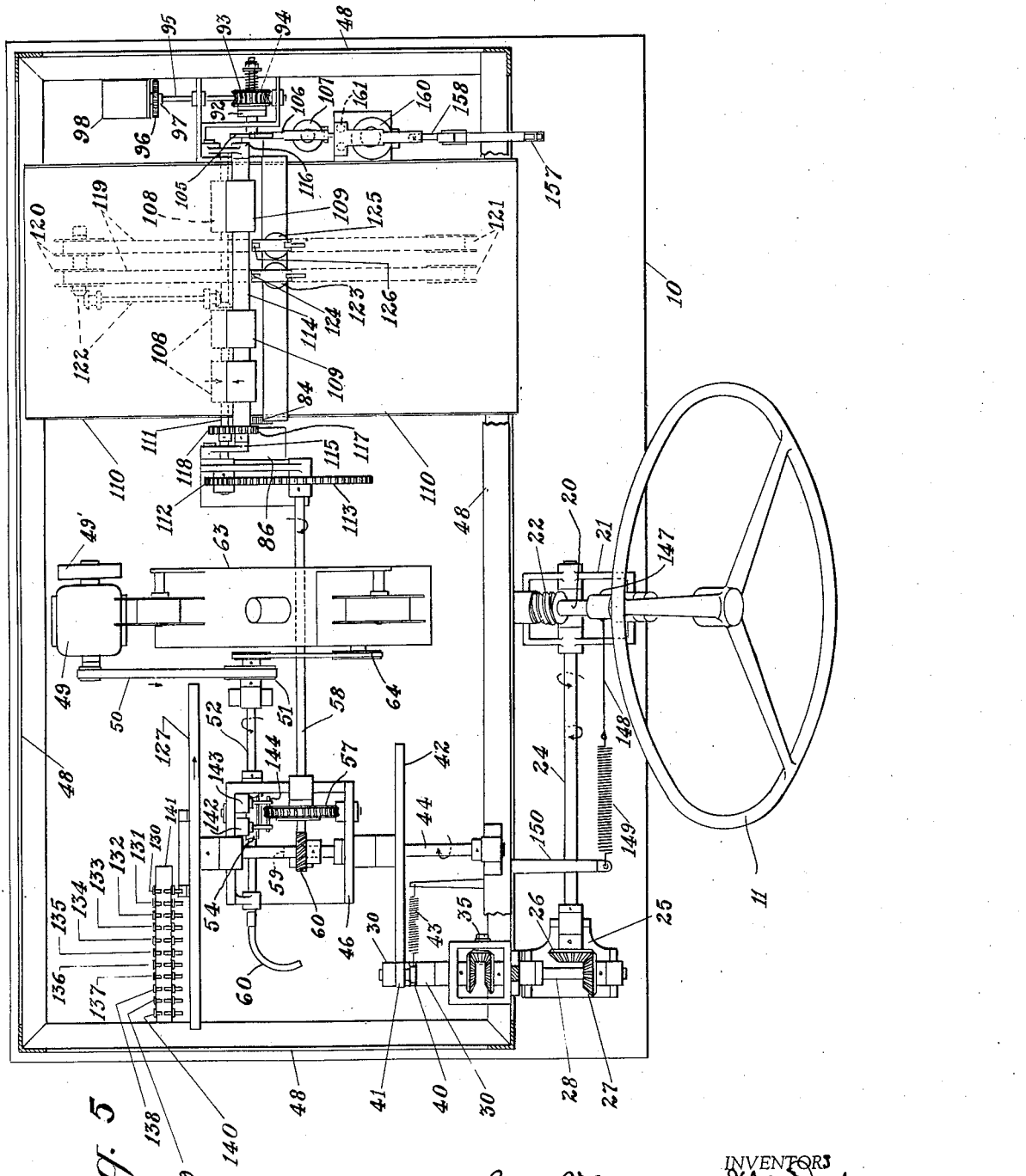

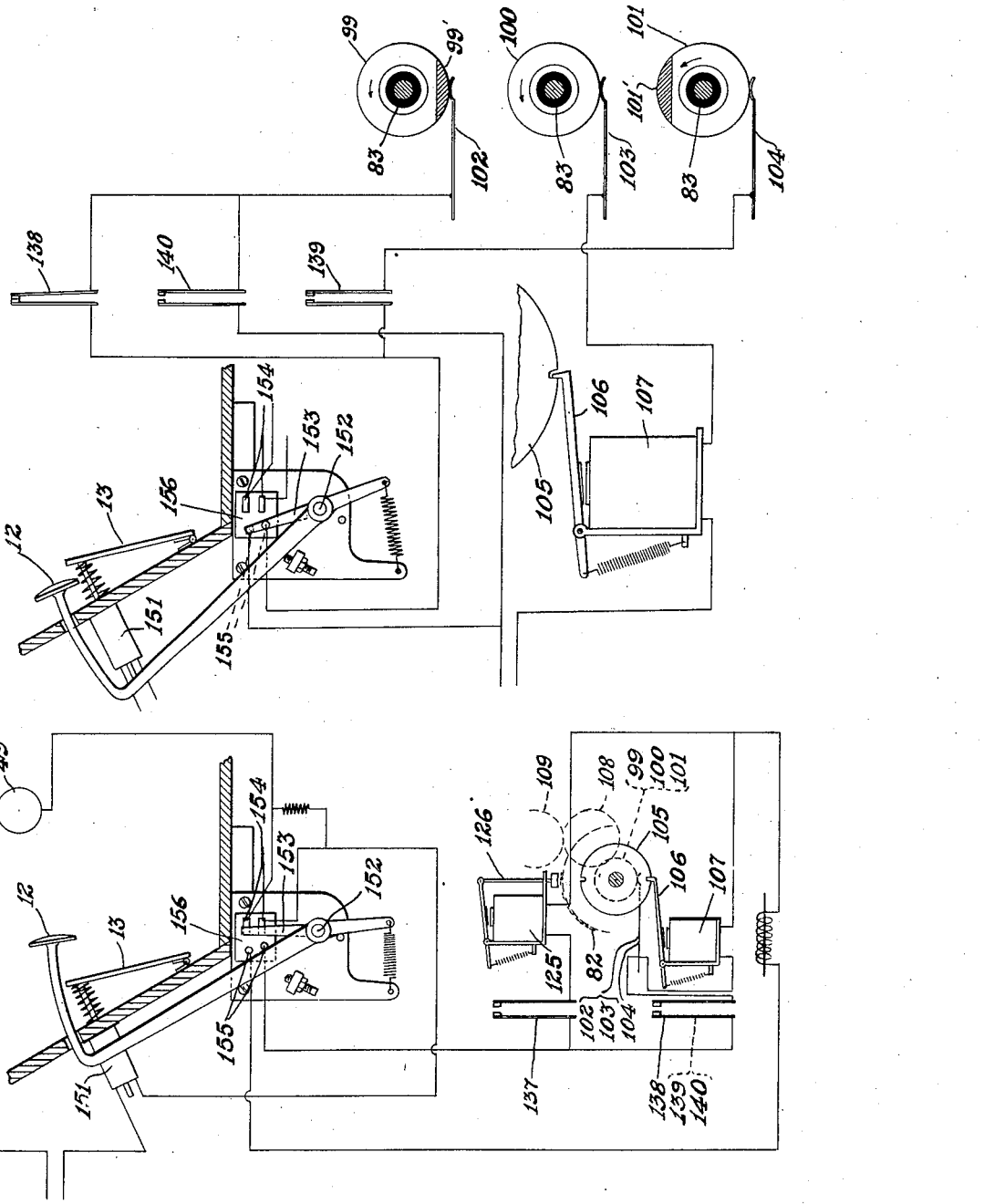

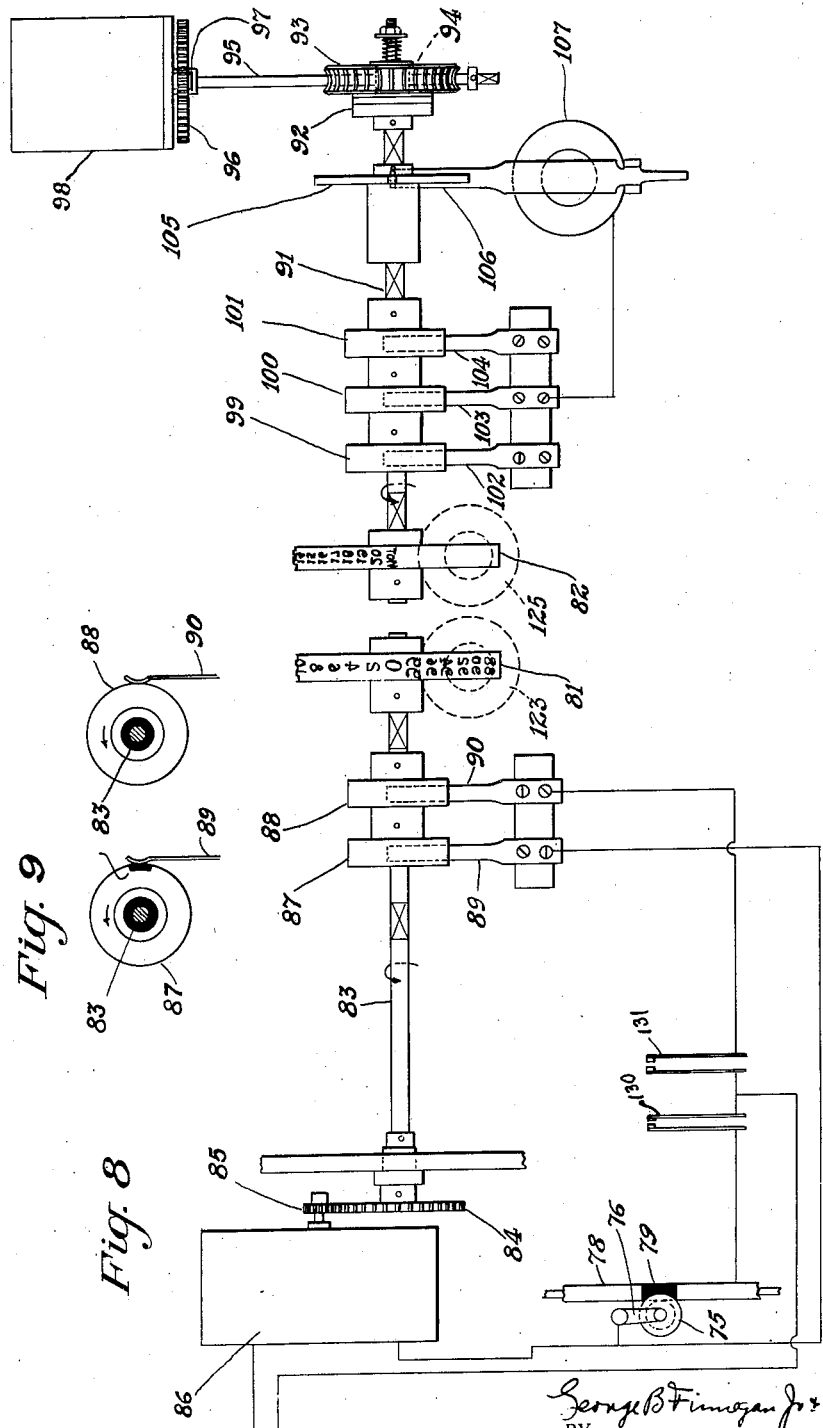

DRIVING TEST RECORD

The results of this test are printed in the r:
_____
_____ nts and increase your own safety.

BE YOUR OWN BACK-SEAT DRIVER

SCORE

Good driving needs watchfulness, fore-sight and skill. The good driver is always attentive, and so for A: When the stop sign appeared on road you did
_____ d ? to your score.

B: After seeing person start to cross road, you required
_____ Add your number to score.

C: You did NOT steer correctly in overtaking and
_____ to your score.

D: You required    tenths of a second to apply brake after
_____ is normal.

E: You did     see child in road soon enough. If not, add
_____ use you are inattentive.

F: You required    light units to see "STOP" against glare.
_____ watch your night driving.

...... headlights will reduce glare for the oncoming car. Both increase your own safety.

Your steering was incorrect      %
of the time.

Your Total Score        The normal total score for this test is 42 points.

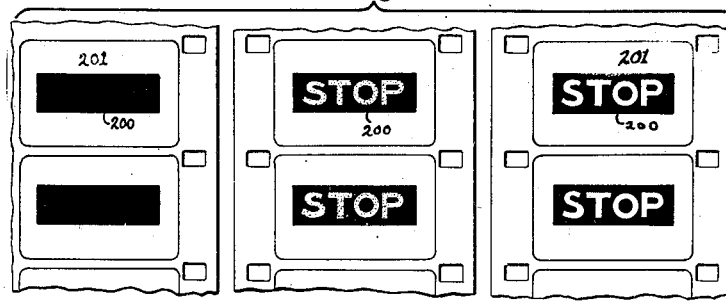

INVENTORS
J.B.Finnegan Jr and H.N.Durham
BY Morgan, Finnegan and Durham
ATTORNEYS Patented Jan. 13, 1942

2,269,444

UNITED STATES PATENT OFFICE 2,269,444

TESTING DEVICE

Hobart N. Durham, Munsey Park, N. Y., and George B. Finnegan, Jr., Mountain Lakes, N. J.

Application July 17, 1937, Serial No. 154,234
In Great Britain July 17, 1936

43 Claims. (Cl. 35—11)

The invention relates to novel and useful means for testing, analyzing and recording the actions and reactions of persons in operating control mechanisms, more particularly the control devices of a vehicle in motion, such as an automobile or aircraft, and for which an application has been filed in Great Britain, July 17, 1936.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 4 is a similar view, from the right, showing the printing mechanism in elevation;

Fig. 5 is a plan view on line a, a of Fig. 3, showing the assembled arrangement of the machine above the table;

Fig. 6 illustrates in detail the brake pedal in off position together with the accelerator pedal and their electrical circuits to the driving motor and brake recording mechanism;

Fig. 7 is a similar view to Fig. 6, with brake pedal in operative position and electrical circuits to controls of the brake recording means;

Fig. 8 illustrates in plan the printing mechanism with its driving motors, type wheels and control commutators and brushes;

Fig. 9 is a detail of the steering control commutators, which provide for the return of the steering type wheel to zero;

Fig. 12 illustrates the printed slip or card as issued from the machine at the conclusion of a test, giving the results obtained by the operator; and Fig. 13 shows means for testing the effect of glare or varying light intensity on the operator's eyes.

Figure 1:
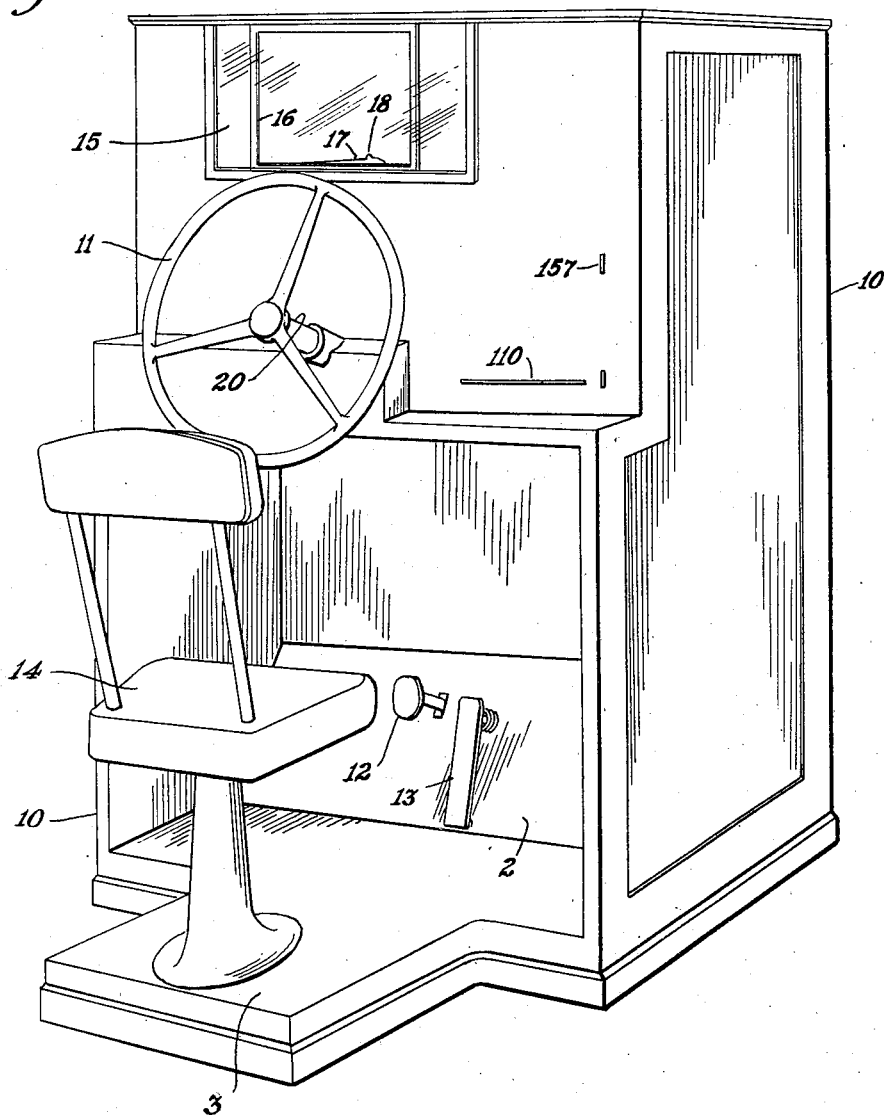
Fig. 1 is a perspective view of the machine as assembled in its cabinet.

The invention is directed to providing new and useful mechanism adapted to test and analyze the actions and reactions of a person in operating the control devices of a vehicle under conditions simulating those of an actual vehicle in use, said mechanism being also adapted to record and produce a permanent record of the analyses. One object of the invention is educational, operating to teach proper driving and to correct faults of the individual.

The invention also tests the ability of the individual to handle the vehicle controls under numerous situations, both common and unusual, simulating those which actually occur during operation of a vehicle. The mechanism is designed to detect and analyze the actions of the operator during each situation and to record the analytic results in words and figures against a predetermined norm or correct operation in each case and to deliver a record of such analyses to the operator. Thus a further important object of the invention is accomplished by subjectively impressing the operator with his own individual faults and shortcomings immediately after detection thereof. Hence the common tendency of the individual to disregard general warnings and illustrations of the faults and accidents of others is counteracted by the invention, which brings directly home to the individual his own personal faults and habits and points them out as they relate to his actions and reactions in circumstances simulating those of actual vehicle operation and traffic conditions.

Likewise the invention provides a novel and highly effective means of publicizing or directly disseminating safety propaganda and impressing the users of the mechanism with the causes of accients and the importance and necessity for safe driving. In this connection the sheet upon which the printed record is produced and delivered by the mechanism may also conveniently contain additional printed data in the nature of general instructions or propaganda with regard to safety. Combined with such printed data or arranged for distribution therewith may be advertising matter pertinent to the subject uppermost in the mind of the operator, such as advertisements of liability insurance companies, automobile manufacturers, public safety organizations and the like.

The mechanism of the invention is designed to present the recorded and printed analyses of the operator's actions and reactions in tabular form so that the record of the operator for each incident of the test and his general average or total for the several incidents of the test is compiled and presented in the form of a totalized score, which score may be compared with the norm or predetermined score for perfect operation of each incident and of the total test. Thus the mechanism may be also utilized for purposes of amusement, providing a competitive appeal in that the operator will try to get a higher score than that of his associates or will try to better his own score or test himself under varying personal physical conditions, such as fatigue, intoxication and the like. If desired the mechanism may be operated for profit as a combined amusement and instruction device, preferably coin-controlled, although the revenue may be realized in other ways. One object of the invention, in this connection, is to provide an attractive and interesting amusement device having a competitive appeal and wherein the appeal is of a perennial or recurrent nature with regard to the individual operator and the general public. The use of the mechanism for amusement and revenue purposes, however, need not interfere with nor detract from the more serious purpose of acting as a testing and instructing medium.

In connection with the foregoing general objects and advantages of the invention, we provide a mechanism which is wholly automatic in its operation, enabling the individual operator to subject himself to a complete series of tests and to obtain his printed and tabulated record without the presence or assistance of an attendant or other human agency. Thus the invention lends itself ideally to organization in a coin-controlled machine which may be stationed for operation by the general public.

In conformity with the foregoing, in its present preferred embodiment the invention provides a mechanism having a set of standard vehicle controls—in the case of an automobile, the driver's seat, steering wheel and brake, clutch and accelerator pedals. In the case of aircraft-pilot testing, the conventional aircraft control devices would be substituted for those of the automobile and it is understood that the broad principles of the invention are not limited to the operation of any specific form of automotive or vehicular control.

Combined with said vehicle controls, the mechanism provides means for presenting to the operator at the controls the visual impression that he has actually when operating a moving vehicle under actual road and traffic conditions. This may be accomplished in various suitable ways. In the present preferred embodiment, the operator looks at the projection of a motion picture film which has been taken from a moving vehicle and so presents a moving picture of a road or street such as would be seen by an operator actually driving a car. However, the impression or illusion of being in a moving vehicle may also be created in various other ways, as for example by having the operator look at the image of a roadway mounted on a travelling belt which moves toward the operator and thus gives the impression of travelling movement as disclosed for example in the French patent to Billon, Addition No. 45,777 of 1935. Broadly speaking the invention is not limited to any specific means of creating the illusion of vehicle movement, several forms of such methods and means being already known in the art.

The invention is designed to present a series of incidents to the operator requiring him to exercise the vehicle controls in various ways during the test. Preferably the operator is given the impression of driving the vehicle along a conventional road or course and various traffic incidents are prearranged to occur successively during the driving course. In the preferred form of the mechanism, such incidents are designed to take place in the motion picture presented on the projection screen wherein they occur successively and in an apparently natural manner just as might happen in normal operation of a vehicle on such a course. Thus a portion of the projected motion picture may be devoted to a steering test, and there may be shown a straight road, curves, sharp corners, a parked car and/or conditions requiring the passing of a moving car. Incidents to distract the driver's attention from the road or sudden obstacles requiring quick and accurate steering, and the like may all be presented to the driver to require him to exercise steering ability.

Another portion of the motion picture film may be devoted to incidents requiring braking reactions, such as might be occasioned by a person suddenly stepping from in front of a parked car, a child falling from a bicycle, the sudden appearance of a car issuing from an obscured lane, or the quick change of a signal light. In other incidents the driver may be subjected to tests for color blindness, such as the showing on the film of red and green signal lights or other signals or driving directions presented in various colors to determine whether or not the driver is color blind, especially to colors utilized in ordinary traffic operations. Other tests may be designed to test the driver's reactions and ability to withstand glare, such as would be caused by oncoming headlights of an approaching car at night. The psychological reactions and effects of situations on the driver may also be submitted to test, as for example the ability of a driver to extricate himself from a sudden dangerous or disturbing situation and accordingly the projected film may involve the driver in one or more situations for that purpose. Similarly the film, or mechanism timed to cooperate in conjunction with the film, may subject the driver to distracting incidents or influences, such as the sudden appearance of a disturbing incident or object at the side of the road which might cause the driver to turn his head or interrupt his concentrated attention to the driving problem. Suitably timed and arranged incidents occurring with or shortly after such peripheral distraction may be arranged so as to subject the driver to a test of concentration or the like.

It will be clear that a multitude of other incidents, similar in general to those hereinbefore described, may be provided. Furthermore, the various tests or reactions and requirements evoked by such incidents may be isolated or combined in numerous ways depending upon the sort of test it is desired to create by a given incident or series of incidents. For example some incidents may test the brake reaction time solely; others solely the ability to steer; others the accelerator control; while other incidents may combine several of these factors and/or others, as will hereinafter appear. One important test incident to which the driver may be subjected in any one of several ways is one testing his ability to foresee an impending or possible danger as he drives along the road and to take suitable steps to avoid the danger should it occur as foreseen.

It will be understood that the motion picture projection apparatus is suitably associated with the vehicle controls whereby the control of the projection is linked to the actions of the driver. Thus the speed of projection and therefore the apparent speed of the vehicle is linked to the accelerator and brake pedals whereby the appearance of fast driving may be given by speeding up the projector motor through use of the accelerator pedal and similarly the brake pedal may cause the projector to slow down and stop. Similarly the steering mechanism may be suitably coordinated with the apparent position of the vehicle on the depicted road so that motion of the steering wheel will apparently cause the vehicle being driven to shift laterally. Furthermore the steering mechanism or controls are suitably coordinated with the apparent forward speed of the vehicle whereby the rapidity of apparent lateral steering movement will depend upon the turning of the steering wheel and the forward speed of the vehicle, just as it does in actual driving conditions.

The illusion or lateral movement and hence the visual effect of steering the vehicle laterally with respect to the road on which the vehicle is travelling is produced by a novel feature of the invention. In the present preferred embodiment the operator views the road scene, formed by the projected motion picture, through a frame which corresponds in outline to the direct field of vision of a driver when correctly watching the road. Said frame in substance corresponds to the part of the windshield through which the driver normally watches the road and may be provided with some steering point, such as a radiator cap outline, which the driver may use as a guide or reference point with respect to a line on the road, as he does when steering a car. The illusion of lateral movement of the vehicle with respect to the moving road scene is effected by imparting lateral movement to said steering frame from the steering wheel, the relative movement between the steering frame and the motion picture road giving the same visual impression as that created when a driver actually steers his car across the road. Coordinated therewith are means, such as a driven cam, for arbitrarily imparting lateral movements to the steering frame, corresponding to curves and turns in the road which the driver should make for proper steering. However, said arbitrary lateral movements cause the steering frame to move opposite to the direction for proper steering in each case so that the driver must turn the steering wheel to hold the steering frame in the proper relation to the road scene. To permit combination of the oppositely acting forces imparted to the steering frame by the cam and by the steering wheel, said elements are interconnected with the frame and each other by differential gearing. Thereby the driver is required to turn the steering wheel at the proper time and in the proper amount so as to appear to keep the vehicle at its proper position on the roadway.

In accordance with the invention the actions and reactions of the driver or operator are detected and/or measured to ascertain and analyze their relation to the prearranged occurrences of the successive incidents on the motion picture film. In connection with an incident calling for application of the brake, for example, timing means is automatically synchronized with the projection of the film. Thus a timing device may be energized or sensitized at the beginning of the incident on the film which calls for application of the brake. The brake pedal itself may be connected with said timing device in any suitable manner, either mechanically or electrically, so that the application of the brake pedal will be registered against the timing device, thus determining the time (commonly called "reaction time") required by the operator to actuate the brake after the mental impression calling for brake operation has been received. Other incidents may call for a certain control operation, such as application of the brake, irrespective of a specific time factor. For example, the invention provides for registering whether or not the operator brought his vehicle to a full stop at a cross road so marked, the speed of application of the brake in such case being relatively immaterial. Similarly the steering movements of the individual operator may be analyzed and registered either for particular incidents or throughout the entire test course and preferably both. Thus the deviations in turning the steering wheel to either side of a predetermined norm or steering track or neutral course may be automatically detected and the total of such deviation ascertained. The foregoing are merely a few illustrative examples of the general manner in which driving errors or reactions may be ascertained, these and other examples thereof being hereinafter disclosed in greater detail, while many additional applications of the general principle herein disclosed will be obvious to those skilled in the art.

The invention further provides for making a printed record of the results ascertained and analyzed as hereinbefore described, said printed record preferably being made synchronously with the analyzing and registering operations. Thus when a timing device is automatically set in operation synchronously with the occurrence of a particular incident on the film, a numbered printing wheel or the like may be caused to turn with the timing device. When the brake pedal is actuated a printing impression is made on the printing wheel in its then position, thereby registering the reaction time in fractions of a second, or other suitable indicia. Similarly the deviations from the true steering course may be suitably transmitted to recording means, such as numbering wheels, whereby the total number or extent of such deviations may be calculated and printed as a total. By providing each subject with a total or sum of his errors, his record may be compared directly with that of the standard or norm for the course and may also be compared immediately with that of other drivers or subjects. It is especially desirable to have a subtotal with respect to steering errors or deviations, as those errors are due to a different type of fault in driving than others relating to reaction time, etc. Likewise certain incidents which involve merely a positive or negative indication of the performance of the proper or improper act may be reduced to a printed record. For example, in the case of the incident above described, if the driver fails to stop at the "stop street," printing means conditioned during the occurrence of the incident may be caused to print a negative indication, such as the word "Not."

A suitable printed form designed to receive the printed indicia of the analyses of the several incidents is preferably arranged to be fed past the printing mechanism coincidently with the occurrence and printing of the incidents so that the proper indication may be printed in or opposite a prearranged code or reference to the incident. In addition, if desired, the results of the steering deviations and/or the several incidents may be totalized and a printed total of the completed test appended to the individual recorded analyses for each incident. At the end of the operation the printed and totalized record will be delivered to the operator.

It will be understood that the foregoing general description and the following detailed description as well are exemplary and explanatory of the invention but are not restrictive thereof.

Referring now in detail to the present preferred embodiment of the invention, illustrated by way of example in the accompanying drawings, the principal mechanical features of the machine may be suitably housed in any appropriate cabinet 10 to which the external vehicle controlling devices are attached. A steering wheel 11 projects from the front face of the cabinet at suitable height from the floor, while brake pedal 12 and accelerator pedal 13 are conventionally mounted in an inclined panel 2 near the bottom of the cabinet. A clutch pedal, not shown, will preferably also be positioned in conventional relation on the panel 2. A driving seat 14 is suitably positioned with respect to the steering wheel and the pedals, being preferably rigidly connected to the frame of the cabinet 10, as by an extension 3 at the bottom thereof. The particular shape and size of the cabinet form no necessary part of the invention and it will be understood that the shape and size as shown are merely illustrative and largely diagrammatic.

A glass-enclosed opening 15 is provided in the front of the cabinet in position to occupy substantially the normal field of view of the vehicle driver and through said window 15 the operator will see the projection of the motion picture film as hereinafter described. A laterally movable frame 16 is mounted directly behind the window 15, said frame being of a size and shape corresponding to the limited field of direct vision of the driver when he is concentrating properly on the road ahead. Fixed to the lower edge of frame 16, and projecting inwardly therefrom is a member 17 shaped to conform to the projected view of an automobile hood, with a projection 18 representing a radiator cap at its inner end. If desired, the spaces between the side edges of frame 16 and the corresponding edges of the window 15 may be relatively obscured, so as to cause the driver to concentrate on the portion of the projected picture framed within the frame 16. For example, translucent wings 4 may be attached to extend from either side edge of the frame 16 so that the area of the projected picture outside the frame 16 will be relatively obscure and thus represent the area of peripheral vision of the driver. The transparency of the wings 4 may be decreased outwardly from the frame edges 16 to simulate the decreasing intensity of vision toward the side.

Figure 3:
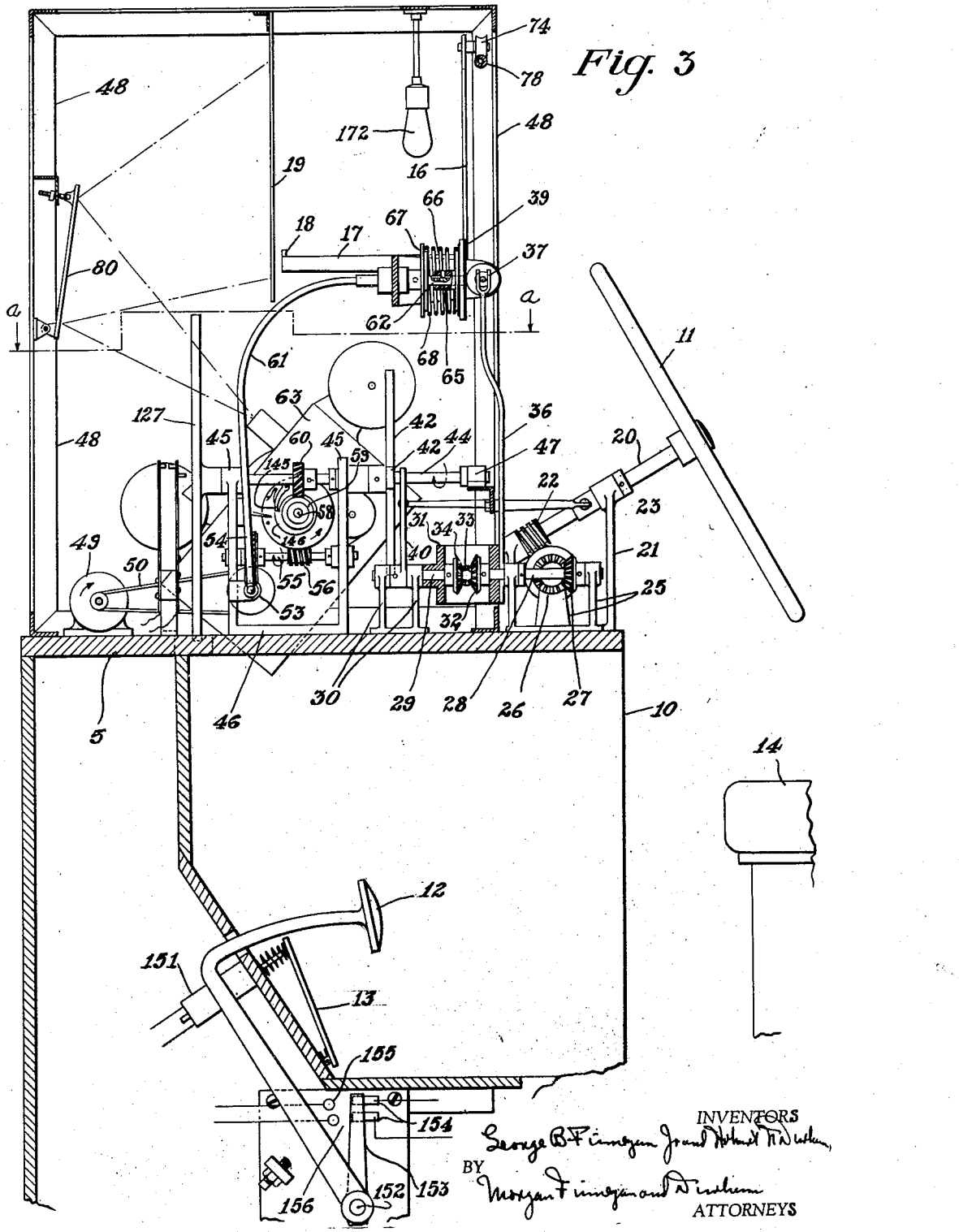
Fig. 3 is an end elevation, viewed from the left of Fig. 2, partly in section, showing the brake and accelerating pedals.

The embodied means for projecting the motion picture of the test course and incidents into the field of view of the driver comprises a translucent projection screen 19 mounted behind the window 15 and preferably just beyond the radiator cap indicator 18 (Fig. 3). A motion picture projector 63 of any suitable design may be mounted at any convenient location within the cabinet. As shown, the projector is designed to throw the picture against an inclined mirror 80 mounted on the rear wall of the cabinet 10, whence the picture is reflected against the translucent screen 19, thereby providing for a relatively long path of projection within the limited space of the cabinet. A reversible motor 49 for driving the projector and other parts of the machine is mounted on the main interior supporting plate 5 of the cabinet, the motor being linked to the drive pulley 64 of the projector by a suitable take-off from the main shaft 52 which is drivingly connected to the motor by belt 50.

In accordance with the invention means are provided for controlling the position of the laterally movable frame 16 from the steering wheel 11. Coordinated therewith are means, such as a cam, for imparting to said frame 16 arbitrary deviating movements corresponding to required turns in the steering course, so that the operator must turn the steering wheel to compensate for the imparted movements and thus apparently keep the vehicle on the correct course. Suitable differential gearing linkage between the steering wheel and the cam provides for combination of the opposing movements thereof, so that the ultimate movement imparted to the frame 16 will be the resultant or combination of the opposing movements of the cam and steering wheel movements. The amount of movement of the steering frame is also coordinated with the apparent speed of the vehicle, so that the actual amount of lateral movement of the frame 16 in a given time will depend upon the resultant of the turning of the wheel and/or the imparted movement from the cam and also upon the vehicle speed.

In the present preferred embodiment, the steering post 20, suitably mounted in bearings of the frame 21, has a worm 22 fixed to its lower end and meshing with worm wheel 23 on shaft 24, also supported in bearings of frame 21. The other end of shaft 24 is supported in a bearing of frame 25 and carries a miter gear 26 meshing with a miter gear 27 on the shaft 28 supported in the bearing of frame 25. Rotatively supported on shaft 28, and a secondary shaft 29 supported by bearings 30, 30, is a differential case 31 enclosing the differential bevel gears 32, 34 and 33 mounted respectively on shafts 28 and 29 and a stud 35 in case 31. Rigidly attached to the differential case 31 is an upwardly extending arm 36 doubly forked at its upper end 37 to embrace and move the friction wheel 38 across the face of a friction disc 39. Mounted on shaft 29 between bearings 30, 30 is an upwardly extending roller arm 40 supporting a cam roller 41 held in contact with a steering cam 42 by tension spring 43.

A steering cam 42, for imparting deviating movements to the frame 16 through the differential, is fixed to shaft 44 rotatively supported in bearings 45, 45 of frame member 46 and bearing 47 carried by cabinet housing frame 48. Cam shaft 44 is driven by the motor 49, belt 50, pulley 51 on shaft 52 and a gear train as follows: Shaft 52 is supported in bearings of frame 46 and carries a worm 53 engaging worm wheel 54 on cross shaft 55 also supported in bearings of frame 46. Shaft 55 carries a worm 56 engaging a worm wheel 57, rotatively mounted on shaft 58 and designed to rotate said shaft in one direction only, as hereinafter set forth. Fixed to rotate with worm wheel 57 is a helical gear 59 meshing with helical gear 60 on shaft 44. The end of shaft 52 extending to the left (Fig. 5) of its outer bearing in frame 46 is connected by means of a flexible shaft 61 to the inner end of shaft 62, driving friction disc 39. Said disc is provided with a backwardly extending hub 65 carrying a pin 66 engaging a key slot in shaft 62 and is thereby slidably mounted on and fixed to rotate with said shaft.

Interposed between friction disc 39 and a disc 67 fixed to shaft 62 is a compression spring 68, driving said disc in clockwise rotation only and tending to continually press it against friction roller 38. Friction roller 38 carries in its hub a key engaging a slot 69 in the shaft 70, and in consequence is slidable along and fixed to rotate said shaft. Shafts 62 and 70 are supported in suitable bearings in the member 71 fixed to frame 48. Fast to shaft 70 is a threaded sleeve 72 engaging threaded lugs 73, 73 projecting from the lower horizontal member of frame 16. It will be obvious that the friction roller 38 as shown in its central position in Fig. 2 will impart no rotative movement from disc 39 to shaft 70, but if moved to the right or left of its central position will produce a clockwise or anti-clockwise rotation to shaft 70, as viewed from the right, and through the threaded sleeve 72 a right or left hand movement of the frame 16.

The periphery of steering cam 42 is so arranged with projections, depressions and concentric portions as to represent perfect steering over the course disclosed by the curves and tangents of the projected picture. Assuming the machine to be in operation, friction disc 39 and cam 42 will be rotating in clockwise direction and a positive movement to the right, following the cam, will be imparted to roller 41 by the tension of spring 43, and through the movement of roller arm 40 shaft 29 and the differential gears 34, 33 and 32, a clockwise rotative movement will be produced in the differential case 31 deflecting the arm 36 and friction roller 37 to the right, resulting in a corresponding movement of frame 16. In a similar manner, projections on cam 42 will cause a left hand movement of frame 16, while concentric portions will maintain friction roller 38 in its central position on the friction disc 39, and rotation will not be imparted to shaft 70, the frame 16 remaining stationary. Movement to the right or left of frame 16 imparted by the friction disc 39 is greater than that which would be imparted by connecting said frame directly to the movement produced by the cam, and in order to maintain the proper steering course, as presented on the screen, must be compensated for by a counteracting rotation of hand wheel 11. Movement to the right or left of frame 16 may be imparted by a right or left hand rotation of the steering wheel 11 acting through worm 22, worm wheel 23, shaft 24, gears 26 and 27, shaft 28 and differential gears 32, 33 and 34 to impart a right or left hand rotative movement of differential case 31 and arm 36 to move friction roller 38 to the right or left on the face of friction disc 39.

To simulate the tendency of an automobile on a level road to return the steering wheel to maintain a straight course, means are provided for returning steering wheel 11 to its normal straight line driving position. Fixed to the steering shaft 20 is an elongated collar 147 carrying an eye to which is attached one end of a flexible cable 148, the other end of which is secured to a tension spring 149 held by a post 150 supported by frame 48. Rotation of the steering wheel 11 will wind cable 148 around collar 147 and be resisted by increasing tension in spring 149 which will restore said wheel to its normal position upon its release.

Other means for correlating a predetermined steering course with the depicted road course and with the movements of the steering wheel may be provided. For example, a predetermined steering course could be outlined as a photo-electric record on the edge of the projected film and the imparted movements of the frame 16 obtained therefrom by suitable photo-electric responsive actuating means. Similarly the invention is not limited to a laterally movable frame, such as 16, for giving the illusion of transverse movement. If desired, the projected picture could be shifted laterally with regard to a fixed steering point to give the same impression of relative movement.

Figure 2:
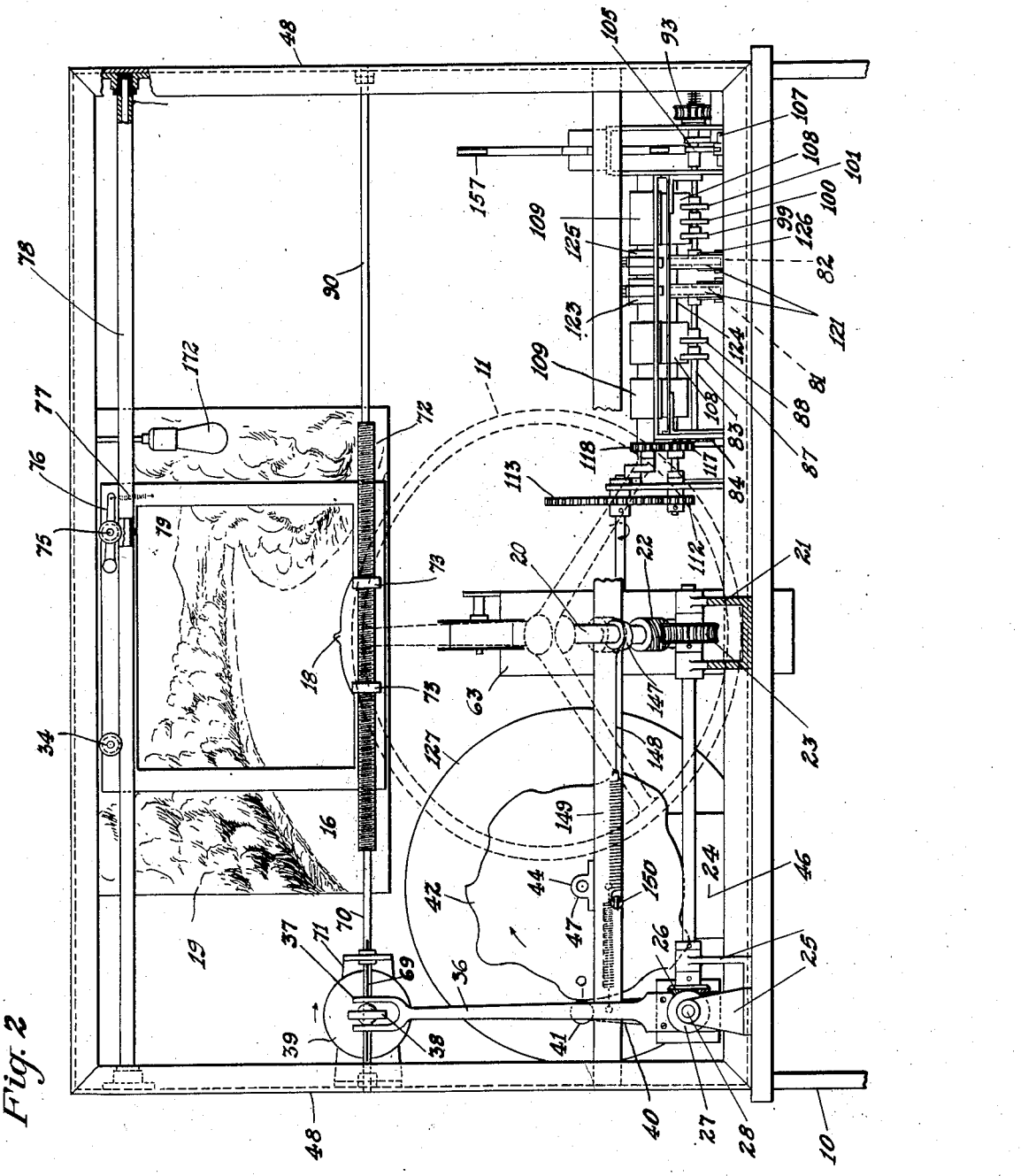
Fig. 2 is a front elevation of the upper portion of the machine, with its housing removed, and illustrating a road scene as projected on the screen.
Figure 10:
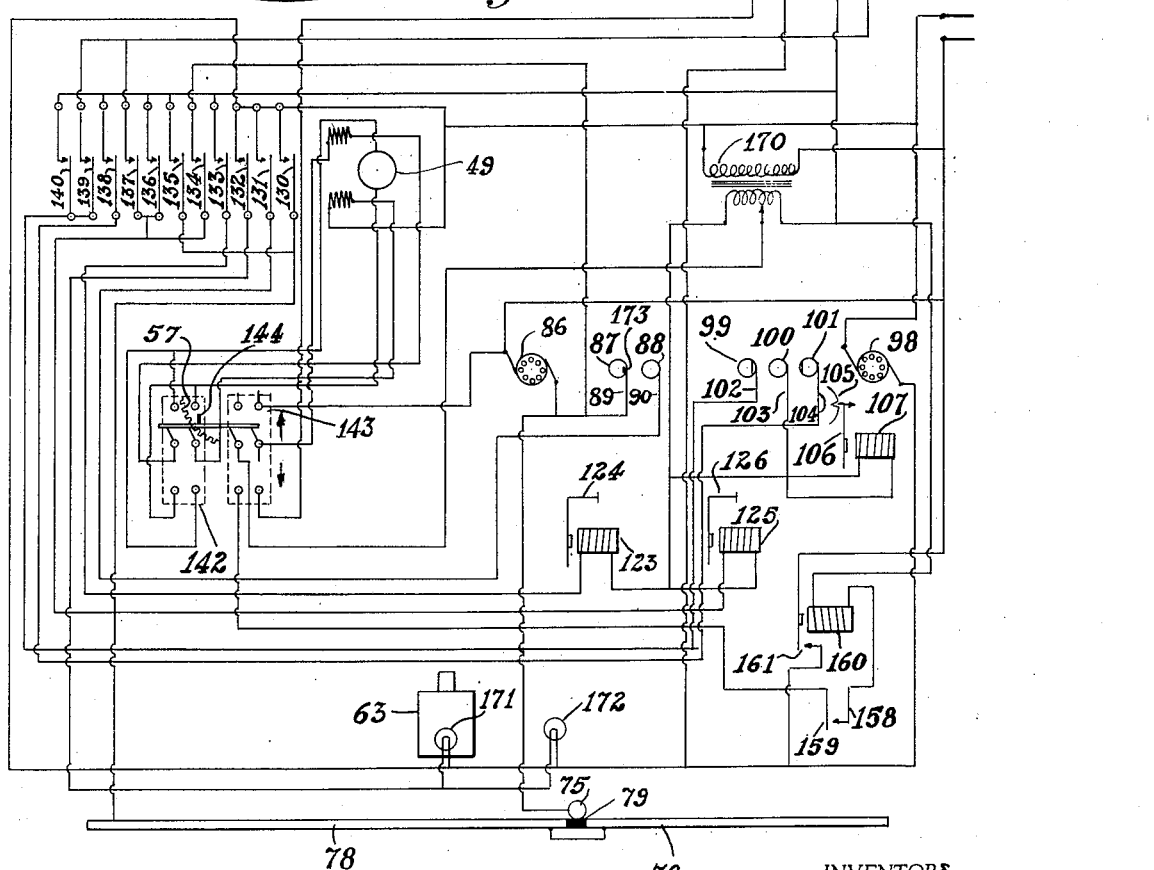
Fig. 10 is a wiring diagram of the various control circuits.

Means are provided for electrically ascertaining and registering any deviation of the steering frame 16 from the right or left of the predetermined proper course. As embodied, the movable frame 16 is supported by a roller 74, and by a roller 75 carried by an arm 76 pivotally mounted to said frame and downwardly pressed by the tension spring 77 against the supporting rod 78 along which frame 16 travels. The rod 78 is supported by and insulated from the frame 48, and roller 75 and rod 78 are electrically connected as shown in Fig. 10 for the purpose as hereinafter set forth. An insulated portion 79 on rod 78 is so placed as to break a circuit when frame 16 is maintained in the correct position to follow the course presented by the projected picture, and is of such a length as to provide a reasonable amount of variation from the exact course without registering a steering error. As the road picture is presented on the screen it moves laterally so as always to present the proper driving line to radiator cap 18, as indicated in Fig. 2 where contact roller 75 rests upon the insulated portion of rod 78. Variations in the movement of frame 16 from the non-registering position caused by the action of cam 42, must be counteracted through the steering wheel and differential gearing as hereinbefore set forth.

As previously stated, means are provided for printing the analytic result of the test for each incident and also for printing the total steering error as obtained from the indications of the circuits energized by the contact roller 75. As embodied, such printing means are comprised in the type wheels 81 for recording the total steering error and type wheel 82 for printing the results of the several incidents. Type wheel 81 mounted on shaft 83 is driven by gear 84 meshing with the pinion 85 carried by the shaft of synchronous motor 86. Mounted on and insulated from shaft 83 are commutator rings 87 and 88 providing electrical connections through brushes 89 and 90 respectively. Commutator 87 is provided with an insulation segment 173 for the purpose hereinafter set forth. Synchronous motor 86 is energized whenever a steering error occurs and thus steering error is measured in the time the steering is incorrect.

As shown, for mechanical convenience, the incident result printing is all effected by the type wheel 82, which is designed to print both time indicia in tenths of a second, up to two seconds, and also to print negative and/or positive indicia for tests calling for such indications. If desired two or more printing wheels could be provided for printing these several indicia. Type wheel 82 mounted on shaft 91 is driven through a friction clutch 92, one half of which is fixed to said shaft and the other to a worm wheel 93 rotatively mounted on shaft 91, the two halves of the clutch being held in contact by a compression spring. Worm wheel 93 is driven by a worm 94 on a shaft 95 carrying the gear 97 in mesh with a pinion 96 on the shaft of motor 98. The motor 98 is preferably of the synchronous type, to act as a timing actuator for the type wheel. Commutator rings 99, 100 and 101 are mounted on an insulated frame shaft 91, rings 99 and 101 having insulation segments 99' and 101' respectively. Electrical connections to the commutators are made through brushes 102, 103 and 104, respectively. Fixed to shaft 91 is a disc 105 provided with two notches so located as to hold type wheel 82 in the "not" or "zero" position through the engagement of an upwardly projecting finger on the armature 106 of a relay 107.

Means for feeding, in proper time relation, a paper slip or card to be printed, are provided by an upper and lower set of rolls 108 and 109 respectively, between which the paper or card is guided by the plates 110, 110 (Fig. 4). Feed rolls 108, 108 on shaft 111 are driven through a pinion 112 meshing with a gear 113 on shaft 59. Shaft 114 carrying rolls 109, 109 is mounted in flexible arms 115 and 116 and driven through gear 117 in mesh with gear 118 on shaft 111. Interposed between the type wheels 81 and 82 and the proper slip or card are ink ribbons 119, 119 driven by rollers 120, 120 and passing over guide rolls 121, 121 (Fig. 4). Rollers 120, 120 derive their movement from shaft 111 through a train of gearing 122 (Fig. 5).

Means for printing from steering type wheel 81 are provided by the solenoid 123 acting through a plunger 124 depressed by the armature of said solenoid when energized. Plunger 124 pressing the paper and ribbon on the type wheels transfers the impression to the underside of the paper. Similar means for printing from the incident type wheel 82 are provided by solenoid 125 and its actuated plunger 126.

Means are provided for controlling the speed of driving motor 49 from the accelerator pedal 13 through a variable resistance 151, so producing variations in the speed of the projected picture and thereby creating the illusion of increasing or decreasing car speed to the operator. By providing driving motor 49 with a fly wheel 49', the effect of slowing down the car is produced when current to the motor is cut by depressing brake pedal 12, the momentum of the fly wheel will continue driving all mechanism for a short period of time, eventually coming to a full stop if the current to the motor remains cut for a sufficient length of time. If the current to the motor is only momentarily broken, the full effect of retardation and acceleration of a car is realized.

Insulated from and fixed to rotate with brake pedal shaft 152 (Fig. 3) is a switch arm 153 normally bridging contacts 154 in the brake-off position and the contacts 155 in the brake-on position when pedal 12 is depressed, for the purpose hereinafter set forth. Contacts 154 and 155 are insulated from the machine by the insulating block 156.

In the invention as disclosed, the machine is started by means of a coin deposited in the chute 157 acting upon the lower arm of bell crank lever 158 to raise the contact arm 158' to make contact with the fixed contact arm 159 to energize relay 160 and complete a primary circuit through contacts 161 as hereinafter set forth. It will be obvious that any form of coin mechanism designed to make the starting circuit may be employed, as well as means for collecting coins or returning in case the machine fails to operate.

Figure 11:
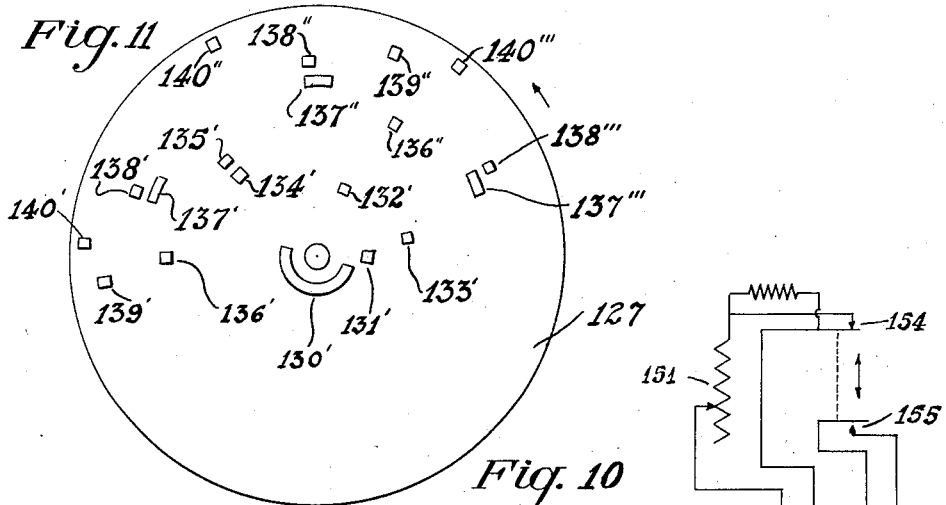
Fig. 11 is the time causing disc for making and breaking the various control circuits in proper time relation to the incidents as they appear projected on the screen.

The invention provides a central control mechanism for timing the operation and relation of the several circuits to coordinate the functioning of the printing means with the projection of the several incidents on the film and with the actuation of the several control devices by the operator. Thus in some incidents the printing wheel 82 will be held from moving out of the "not" printing position until the operator has stepped on the brake pedal, whereupon the wheel is released to turn a half revolution. In another incident the printing wheel is caused to turn by a timing motor at the beginning of the incident and the printing plunger 124 is actuated by the brake pedal, through suitable circuits. Again the printing plunger may be actuated by the steering controls or again, in some incidents by means (not shown) actuated from the accelerator pedal. The embodied means for making and breaking circuits controlling registration of steering error, brake reactance, and other functions of the machine (Figs. 5 and 11) are comprised in the timing disc 127 on which are mounted projecting cam pieces 130', 131', 132', 133', 134', 135', 136', 137', 138', 139' and 140', so located as to make and break insulated switches 130, 131, 132, 133, 134, 135, 136, 137, 138, 139 and 140 respectively as said disc is rotated. Timing disc 127 is mounted on shaft 44 and rotates in time relation with the incidents as projected on the screen 19, as will hereinafter appear.

To explain the operation of the central timing control, a series of incidents as they occur on the projected film, in conjunction with the respective circuits required for registering the analytic results of each test, will now be set forth in detail. The machine being plugged in to a suitable current supply and the operator being seated, a coin is deposited in the chute 157 to deflect arm 158 and raise arm 158' to contact arm 159; a circuit is completed through the low voltage tap of transformer 170 (Fig. 10), energizing relay 160 to actuate armature contact 161 closing the high voltage circuit to motor 98, projector lamp 171 and driving motor 49 to start projecting the film strip on screen 19 to represent an assumed vehicle idling speed. The operator may vary his driving speed at will, by depressing or releasing accelerator pedal 13 as hereinbefore described.

By way of illustration, and referring to the printed form of Fig. 12, the first incident appears as a stop sign on the road, at which time, through the rotation of timing disc 127, switch 139 is closed by projection 139' on the timing disc, allowing the operator a two second interval in which he may apply the brake; assuming that he does apply the brake, contact 155 is closed and through brush 104, commutator 101, commutator 100 and brush 103, low voltage current is supplied to energize relay 107 to deflect arm 106 to release its retention of disc 105 and thus permitting motor 98 to drive shaft 91 through friction clutch 92 and rotate type wheel 82.

In starting position, type wheel 82 presents in printing position the word "Not" and for the space of 180° in the direction of rotation is blank, in the following 180° it is numbered from one to twenty corresponding in tenths of a second to the elapsed time in applying the brake. If the operator has failed to apply the brake to close switch 155 within the allowable two seconds of time provided for that incident by projection 139' on the timing disc 127 for holding the associated switch 139 closed, then the circuit is not complete through relay 107, hence no rotation of type wheel 82 takes place and the word "Not" remains in printing position. Further rotation of disc 127 caused projection 136' to close switch 136, energizing relay 125, causing armature plunger 126 to print the word "Not." In turn switch 140 is closed to complete circuit through brush 102, commutator 99, commutator 100, brush 103 to energize relay 107 and release type wheel 82, as hereinbefore described, so that zero will be rotated to the printing position. A proper interval of time is allowed between the occurrence of the several incidents to allow the operator to resume his driving speed.

Incident number two may be assumed to be a person suddenly dashing across the road, as indicated in Fig. 12. When a predetermined number of frames of the film strip of this incident have passed the aperture of the projector, switch 138 is closed by projection 138' on timing disc 127, competing circuit through brush 104, commutator 101, commutator 100 and brush 103 to energize relay 107 and actuate release armature 106 to free disc 105 and permit the rotation of type wheel 82 as hereinbefore set forth. Switch 137 is closed at the same instant as switch 138 by the corresponding projections 137' and 138' on timing disc 127 and the application of brake pedal 12 is required to close switch 155 to complete the circuit to energize relay 125 and cause armature plunger 126 to print the elapsed brake reactance time in tenths of a second.

Incident number three (Fig. 12) may require the operator to steer around an obstruction. At the same time that the obstruction appears on the screen, switches 134 and 135 are closed by projections 134' and 135' on timing disc 127. Assuming that the operator fails to turn the steering wheel the required amount to clear the obstruction and thus compensate for the movement imparted to contact roller 75, then contact is closed through rod 78, switch 135 and switch 134 to energize relay 125 and cause plunger 126 to print the word "Not." Thus in this incident the steering wheel operation controls the printing from printing wheel 82. If the operator has properly compensated for the obstruction by the movement of the steering wheel, contact roller 75 will not have left the insulation member 79 and no circuit will have been completed to operate the printing mechanism. At the conclusion of incident three, switch 140 is closed by the projection 140" on disc 127 and through brush 102, commutator 99, commutator 100 and brush 105, a circuit is completed to energize relay 107 allowing the resetting of type wheel 82 for incident number four.

Incident number four may be a stop sign at an intersection, which would record the brake reactance time of the operator through the same circuits as set forth for incident number two.

The invention further provides a test or tests of the driver's ability to concentrate on his driving problems and to foresee possible and/or unexpected obstacles or other matters which may occur ahead. Accordingly the invention provides means for causing a distracting influence, either visual, oral, tactile, or a combination thereof, to impinge upon the attention of the driver during or just prior to the occurrence of the incident furnishing the obstacle or danger in the driving path. Incident number five illustrates one example of how such a distraction may be embodied in the mechanism.

Incident number five will be taken as a child on a bicycle riding in the probable path of the car, that is the path which the car would normally follow if driven with respect to the road and without regard to the fortuitous presence of the child or the bicycle. At the same time that the child appears on the screen, the closing of switch 132 by projection 132' on disc 127 completes the circuit to lamp 172, located as shown in Fig. 2, at one side of the screen 19, in front of which may be placed a translucent screen picture offering a peripheral distraction to the operator in order to interrupt or detract from his continued attention to the road ahead. His failure to pay proper attention would be evidenced by the printed word "Not" on the score sheet for this particular incident. The circuits closed, other than that for illuminating lamp 172, by the actuating of projection 132' on switch 132, are exactly the same circuits as those required for incident number one, except that projections 136", 139" and 140" on disc 127, actuate switches 136, 139 and 140, respectively.

Incident number six, comprising a glare resistance test, may be taken at night and may be a stop sign progressively illuminated as the car advances to record the time required by the operator to perceive the word "Stop," the elapsed time being indicated on the score sheet as light units, which are established as an arbitrary measure to brake reactance time. As shown by the film in Fig. 13, the image projected from the motion picture film for this incident first shows a black area 200 on the screen surrounded by a wide margin of full intensity 201 so as to dazzle the subject's eyes. As the film progresses the word "Stop" gradually becomes visible in the black area 200 and at the conclusion of the incident, the word "Stop" is of full intensity on the screen (transparent on the film). Thus the operator is subjected to a test in which an image of gradually increasing contrast is closely surrounded by an intense light, truly simulating conditions of night driving where dazzling headlights must not interfere with the driver's seeing a dark object or person on a poorly lighted road. The circuits required for recording incident number six are identical with those closed in incident two through the timing disc 127, except that projections 137''', and 138''' actuate switches 137 and 138.

The means for accumulating the steering errors for the entire course through the circuit energization from wheel 75 and for causing same to be printed from type wheel 81 comprise the synchronous motor driven drum 81. At the conclusion of incident six, switch 133 is closed by projection 133' on disc 127 energizing relay 123, deflecting plunger arm 124 to print the accumulated total steering error as covered by the steering test period and switch 131 is closed by cam 131' to return the printing drum to zero. The synchronous motor 86 which is energized whenever contact wheel 75 is to one side or the other of the insulated portion 79, so as to contact with the conducting rail 78 so long as switch 130 is closed by the elongated projection 130' on disc 127. Upon completion of the test the steering error is printed by energizing solenoid 123, and thereafter printing drum 181 is returned to zero by the coaction of switch 131 and the commutating rings 87 and 88.

When the complete cycle of incidents has been run through and the test results printed in the spaces provided on the record sheet, as shown in Fig. 12, the operator will have a separate marking or score for each incident. The total of these separate scores, plus the total for steering error may then be added to give the operator's total in comparison with that indicated as normal.

When the complete film has been fed through the projector, the invention provides for rewinding the film on the projector spools by reversing the motor 49 and thus driving the projector spools in reverse. In the meantime the other parts of the mechanism are automatically disconnected from the motor drive in reverse so that they retain their initial positions until the rewinding has been completed and the machine is ready to begin a new cycle. As embodied in the mechanism as disclosed, when timing disc 127 in its rotative movement arrives at its initial starting point, switch 131 is closed by projection 131' and through brush 90, commutator 88, commutator 87, brush 89, the circuit is closed to steering recording motor 86 to rotate steering type wheel 81 until the insulated portion 172 on commutator 87 breaks the circuit and leaves zero on the type 81 in position to start accumulating steering error in the next operation of the machine. At the same moment that timing disc 127 reaches its initial starting point, pin 144 in worm wheel 57 acts upon the arms of switches 142 and 143 causing them to snap in position, switch 142 to reverse the fields of motor 49 and its direction of rotation and so start the rewinding of the film strip, and switch 143 to supply current direct from the line to energize motor 49, and at the same time breaking the circuit through relay 160 to stop motor 98 and cut out the projector lamp 171.

The paper feed rolls 108 and 109, ribbon 119, timing disc 127, and steering cam 42 are not driven in reverse rotation, owing to the nonengagement of pawl 145 with the one tooth ratchet 146 fixed to shaft 58. Worm wheel 57, at the end of its reverse rotation, snaps switches 142 and 143 into forward position, cutting the circuit through relay 160 and changing the field of motor 49 for forward direction of rotation, thus providing for the next operation of the machine by the insertion of a coin in the chute 157.

At the conclusion of the forward movement of the machine, the printed score sheet or card has so progressed as to project through the slot 110, and being free from its feed rolls, may be pulled out by the operator.

In the invention as disclosed, a rewinding film strip is indicated, although, with slight modifications in mechanism, a continuous or looped film may be used in order to eliminate time lost in rewinding and to minimize current consumption. It will be evident that either type of film strip may be of such a length as to cover one or more complete test pictures, and that the steering and timing cams may be so speeded or modified as to cover a corresponding plurality of tests. Furthermore, the machine can be quickly adapted to operate with a new film merely by substituting a different timing disc 127 which is correlated to function with the new film.

The invention in its broader aspects is not limited to the specific mechanisms shown and described but departures may be made therefrom within the scope of the accompanying claims without departing from the principles of the invention.

What we claim is:

1. Mechanism for testing and recording the ability of a person to drive a vehicle including in combination a set of vehicle-driving controls to be actuated by an operator, means for presenting to the operator a moving scene giving the illusion that the vehicle is travelling over a course, said scene presenting a situation requiring actuation of a control and means responsive to said control for making a printed record of the manner in which the control was actuated.

2. Mechanism for testing and recording the ability of a person to drive a vehicle including in combination a set of vehicle-driving controls to be actuated by an operator, means for presenting to the operator as incidents of a moving scene a succession of different situations requiring operation of one or more of the controls, and means set in operation thereby for recording the manner in which the operator actuates the controls during each situation.

3. Mechanism for testing and recording the ability of a person to drive a vehicle including in combination a set of vehicle-driving controls to be actuated by an operator, means for presenting to the operator a moving scene comprising a succession of different situations requiring operation of one or more of the controls and printing means responsive to said controls for recording the manner in which the operator actuates the controls during each situation.

4. Mechanism for testing and recording the ability of a person to drive a vehicle including in combination a vehicle-steering wheel, means for simulating to the operator movement of the vehicle over a predetermined course, a device responsive to the steering wheel for indicating the position of the vehicle with respect to the course, means for imparting deviating movements to the indicating device, and means for combining the effect of the steering wheel movements and the imparted movements to govern the position of the indicating device.

5. Mechanism for testing and recording the ability of a person to drive a vehicle including in combination a vehicle-steering wheel, means for simulating to the operator movement of the vehicle over a predetermined course, a device responsive to the steering wheel for indicating the position of the vehicle with respect to the course, means for imparting deviating movements to the indicating device and means responsive to the apparent speed of the vehicle for combining the effect of the steering wheel movements and the imparted movements to govern the position of the indicating device.

6. Mechanism for testing and recording the ability of a person to drive a vehicle including in combination a vehicle-steering wheel, means for simulating to the operator movement of the vehicle over a predetermined course, a device responsive to the steering wheel for indicating the position of the vehicle with respect to the course, means for imparting deviating movements to the indicating device, means for combining the effect of the steering wheel movements and the imparted movements to govern the position of the indicating device and means for ascertaining the resultant deviations of the steering wheel from the course.

7. In a driver testing device having a moving road scene presented to the subject's view, a member movable to vary the subject's view of said scene, and means for moving said member, said means including a differential one part of which is controlled by the subject and other means for controlling another part of said differential, said other means being actuated independently of the subject.

8. In a testing device, means for projecting an image on a screen of gradually increasing contrast adjacent to an area of high intensity illumination, the contrast increasing at a predetermined rate control means operable by a subject and means responsive to the control for measuring and recording the time at which the image is discernable to a subject.

9. Mechanism for testing and recording the ability of a person to drive a vehicle including in combination one or more vehicle driving controls, means for presenting to an operator at said controls a stimulus calling for actuation of a control, timing means for measuring the operator's reaction time between stimulus and control actuation, and printing means responsive to the operation of the control for making a printed record of said reaction time.

10. Mechanism for testing and recording the ability of a person to drive a vehicle including in combination one or more vehicle driving controls, means for presenting to an operator at said controls a stimulus calling for actuation of a control, timing means for measuring the operator's reaction time between stimulus and control actuation, and printing means cooperating with the timing means and responsive to the operation of the control for making a printed record of said reaction time.

11. Mechanism for testing and recording the ability of a person to drive a vehicle including in combination one or more vehicle driving controls, means for presenting to an operator at said controls a moving scene giving the illusion of travelling over a course, and printing means responsive to the operation of a control for making a printed record of the manner in which said control is operated.

12. Mechanism for testing and recording the ability of a person to drive a vehicle including in combination a vehicle control, means for presenting a moving scene to a subject at said control, time measuring means set in operation at a predetermined point in said scene and recording means actuated by operation of the control to record the elapsed time measured by said time measuring means.

13. Mechanism for testing and recording the ability of a person to drive a vehicle including in combination a set of vehicle controls, recording means, and means for selectively interconnecting the recording means with one of said controls for a predetermined period, whereby the recording means will render a record in response to the operation of said control during said period.

14. Mechanism for testing and recording the ability of a person to drive a vehicle including in combination a set of vehicle controls, printing means, and means for selectively interconnecting said printing means with one of said controls for a predetermined period, whereby said printing means will be actuated to print a record upon operation of said control during said period.

15. Mechanism for testing and recording the ability of a person to drive a vehicle including in combination a set of vehicle controls, printing means, and means for selectively interconnecting said printing means wtih one of said controls for a predetermined period, whereby said printing means will be actuated to print a record upon operation of said control during said period, said printing means being connectable to other of said controls during other selected periods.

16. Mechanism for testing and recording the ability of a person to drive a vehicle including in combination a vehicle control, means for producing a stimulus calling for operation of the control by a subject at said control, timing means for measuring the time elapsing after occurrence of the stimulus and printing means responsive to the operation of the control and cooperating with said time-measuring means to print the time elapsed between occurrence of the stimulus and operation of the control.

17. Mechanism for testing and recording the ability of a person to drive a vehicle including in combination a set of vehicle controls, means for presenting a moving scene to a subject positioned at said controls to give the illusion of travelling in a vehicle, time-measuring means associated with said scene-presenting means and automatically set in operation at a predetermined point in said moving scene and printing means responsive to the operation of a control for printing the elapsed time indicated by time-measuring means at the moment the control is operated.

18. Mechanism for testing and recording the ability of a person to drive a vehicle including in combination a set of vehicle controls, means for presenting a moving scene to a subject positioned at said controls to give the illusion of travelling in a vehicle, timing means for measuring the elapsed time during a predetermined portion of said scene, printing means adapted to cooperate with said time-measuring means upon actuation of a control and means associated with the moving scene for temporarily rendering said printing means responsive to the actuation of one of the controls.

19. Mechanism for testing and recording the ability of a person to drive a vehicle including in combination a set of vehicle controls, means for projecting a motion picture of movement along a road to give to a subject positioned at said controls the illusion of travel in a vehicle, said film containing incidents calling for the actuation of different controls, recording means, and means associated with the projection of the film for rendering said recording means responsive to the operation of the particular control whose operation is called for by the particular incident appearing on the film.

20. Mechanism for testing and recording the ability of a person to drive a vehicle including in combination a set of vehicle controls, means for projecting a motion picture of movement along a road to give to a subject positioned at said controls the illusion of travel in a vehicle, said film containing incidents calling for the actuation of different controls, recording means, and means associated with the projection of the film for rendering said recording means responsive to the operation of the particular control whose operation is called for by the particular incident appearing on the film, said means being further adapted to render the recording means responsive to the operation of a different control during a correspondingly different incident on the film.

21. Mechanism for testing and recording the ability of a person to drive a vehicle including in combination one or more vehicle driving controls, means for presenting to an operator at said controls a moving scene giving the illusion of travelling over a course, timing means for measuring elapsed times from predetermined points in said moving scene, and printing means cooperating with said timing means and responsive to the operation of a control for making printed records of the manner in which said control is operated with respect to said various time periods.

22. Mechanism for testing and recording the ability of a person to drive a vehicle including in combination one or more vehicle driving controls, means for presenting to an operator at said controls a moving scene giving the illusion of travelling over a course, printing means automatically operative at a predetermined point in said moving scene, and indicating means responsive to the operation of a control and cooperating with said printing means to give a printed indication of the operation of said control prior to the occurrence of said predetermined point in said scene.

23. Mechanism for testing and recording the ability of a person to drive a vehicle including in combination one or more vehicle driving controls, means for presenting to an operator at said controls a moving scene giving the illusion of travelling over a course and printing means automatically operated after a predetermined point in said moving scene for recording previous operations of a control.

24. Mechanism for testing and recording the ability of a person to drive a vehicle including in combination one or more vehicle driving controls, means for presenting to an operator at said controls a moving scene giving the illusion of travelling over a course, and printing means automatically operated after a predetermined point in said moving scene for recording previous operations of or failures to operate a control.

25. Mechanism for testing and recording the ability of a person to drive a vehicle including in combination a set of vehicle controls, means for presenting to an operator at said controls a moving scene giving the illusion of travelling over a course, printing means operatively associated with the controls and the moving scene for recording operations of said controls with respect to said scene presentation, and means for positioning at said printing means a form to be printed upon, said form bearing previously printed matter laid out to cooperate with the records printed by said printing means whereby said form as printed will give to the reader a completely legible record of the control operations with respect to the moving scene.

26. Mechanism for testing and recording the ability of a person to drive a vehicle including in combination a set of vehicle driving controls, means for projecting before an operator at said controls a motion picture taken from a moving vehicle, thereby giving the illusion of travel along a course, connections between the projector and the controls for regulating the apparent movements of the moving vehicle, and printing means responsive to the operations of said controls for making a printed record of the manner in which said controls are operated with respect to the motion picture.

27. Mechanism for testing and recording the ability of a person to drive a vehicle including in combination a set of vehicle-driving controls, timing means for measuring the time required for an individual to actuate a control after receiving a stimulus to actuate said control and recording means responsive to operation of the control for making a record of said reaction time.

28. In a driver testing mechanism in combination a vehicle-driving control, a time-measuring device, a printing wheel rotated by said device and means responsive to the control for taking an impression from the printing wheel.

29. In a driver testing device in combination means for presenting to a subject a moving scene creating the illusion that the subject is travelling in a vehicle along the road, vehicle controls including a steering wheel and accelerator, means responsive to the accelerator for varying the apparent speed of movement along the road, position-indicating means responsive to movements of the steering wheel for varying the apparent position of the subject laterally with respect to the road, automatic control means for imparting arbitrary deviations to said position-indicating means, and means for combining said arbitrary movements and movements of the steering wheel into resultant movements for controlling the resultant position of said indicating means.

30. In a driver testing device in combination means for presenting to a subject a moving scene creating the illusion that the subject is travelling in a vehicle along the road, vehicle controls including a steering wheel and accelerator, means responsive to the accelerator for varying the apparent speed of movement along the road, position-indicating means responsive to movements of the steering wheel for varying the apparent position of the subject laterally with respect to the road, automatic control means for imparting arbitrary deviations to said position-indicating means, means for combining said arbitrary movements and movements of the steering wheel into resultant movements for controlling the resultant position of said indicating means, and means for ascertaining the extent to which the subject fails to correct for said arbitrary movements by movements of the steering wheel.

31. Mechanism for testing and recording the ability of a person to operate a vehicle including in combination a vehicle control, means for presenting to an operator at said control a stimulus calling for actuation of the control, timing means for measuring the time elapsing after occurrence of the stimulus, means for supporting a record form carrying indicia relating to reaction times for said control, and means actuated by operation of the control to mark upon said form a record of the reaction time of the operator.

32. Mechanism for testing and recording the ability of a person to steer a vehicle including in combination a steering wheel, movable means actuated by the steering wheel to follow a steering course presented to the driver, timing means for measuring the deviations from the proper steering course by the driver, means associated therewith for supporting a record form carrying indicia relating to the measurement of said steering deviations, and means actuated by operation of the steering wheel to mark upon said form a record of the steering deviations made by said driver.

33. In a testing device, means for presenting tests calling for manual response by an operator, a timing member for measuring the length of time required to perform operations, means for normally holding the member against timing movement, operator-controlled means for releasing said member for timing movement, means automatically controlled by said test-presenting means for stopping the timing member, said timing member also having means automatically controlled for release by said test-presenting means and means for stopping it controlled by the operator whereby the timing member may be automatically released and manually stopped or may be manually released and automatically stopped.

34. In a testing device, means for presenting tests calling for manual response by an operator, a timing member for measuring the length of time required to perform operations, means for normally holding the member against timing movement, operator-controlled means for releasing said member for timing movement, means automatically controlled by said test-presenting means for stopping the timing member, said timing member also having alternatively operable means automatically controlled for release by said test-presenting means and means for stopping it controlled by the operator whereby the timing member may be automatically released and manually stopped or may be manually released and automatically stopped.

35. In a driver testing device having a moving road scene presented to the subject's view, in combination a member movable to vary the subject's view of said scene, a steering device operated by the subject and connected to impart movement to said scene-varying member, other control means for imparting deviating movements to said member, said member moving according to the combined motions imparted to it by the steering device and the control means.

36. In a driver testing device having a moving road scene presented to the subject's view, in combination a member movable to vary the subject's view of said scene, a steering device operated by the subject and connected to impart movement to said scene-varying member, a pattern moved with said moving road scene, control means for imparting deviating movements to said member in accordance with said pattern, said member moving according to the combined motions imparted to it by the steering device and the control means.

37. Mechanism for testing and recording the ability of a person to steer a vehicle including in combination a steering wheel, movable means actuated by the steering wheel to follow a steering course presented to the driver, means for measuring the deviations from the proper steering course by the driver, and means for recording the total of said deviations comprising devices for accumulating said measurements of deviations and means for making a printed record of the accumulated total thereof.

38. Mechanism for testing and recording the ability of a person to drive a vehicle including in combination one or more vehicle driving controls, means for presenting to an operator at said controls a moving scene giving the illusion of travelling over a course, and printing means responsive to the operation of a control for making a printed record of the manner in which said control is operated, said means including a device responsive to movements of the control for accumulating a record of said movements and means for printing said record as a total.

39. Mechanism for testing and recording the ability of a person to drive a vehicle including in combination a set of vehicle-driving controls to be actuated by an operator, means for presenting to the operator a moving scene comprising a succession of different situations requiring operation of one or more of the controls and printing means responsive to said controls for recording the manner in which the operator actuates the controls during each situation, and means for simultaneously making a record of the steering operations of the operator.

40. In a driver testing device having a projector for presenting a motion picture of a road scene to the subject's view, in combination a member movable relative to the subject to vary the subject's view of said scene, a steering device operated by the subject and connected to impart movement to said scene-varying member, a pattern designed in accordance with curves in the road portrayed in said moving road scene, said pattern operating synchronously with the projection of said film, control means for imparting deviating movements to said member in accordance with said pattern, said member moving according to the combined motions imparted to it by the steering device and the control means.

41. In a driver testing device in combination means for presenting to the driver a course to be steered, a steering wheel, movable means actuated by said steering wheel to follow said course, means for measuring the deviations of said movable means from the proper steering course, totalizing means for accumulating said measurements of deviations, and means for rendering a visible numerical total of said accumulated deviations.

42. In a driver testing device in combination means for presenting to the driver a moving scene giving the illusion that the vehicle is travelling over a course, vehicle driving controls to be actuated by the driver, means for measuring errors in the operation of said controls by the driver in response to said scene, totalizing means for accumulating said measurements of error, and means for rendering a visible numerical total of said accumulated errors.

43. In a driver testing device in combination means for presenting to the driver a moving scene giving the illusion of travel over a course, cam means for imparting the illusion of lateral movement with respect to said course, a steering wheel, movable means actuated by said steering wheel to follow said course, means for measuring the deviations of said movable means from the proper steering course, totalizing means for accumulating said measurements of deviations, and means for rendering a visible numerical total of said accumulated deviations.

GEORGE B. FINNEGAN, Jr.
HOBART N. DURHAM.